United States Patent [19]
Sasaki et al.

[11] Patent Number: 5,475,810
[45] Date of Patent: Dec. 12, 1995

[54] PIE CHART PROCESSING METHOD AND PROCESSOR

[75] Inventors: Kaori Sasaki; Ritsuko Nishikawa, both of Tokyo, Japan

[73] Assignee: Oki Electric Industry Co., Ltd., Tokyo, Japan

[21] Appl. No.: 834,405

[22] Filed: Feb. 12, 1992

[30] Foreign Application Priority Data

Feb. 20, 1991 [JP] Japan .................................... 3-060941
Feb. 20, 1991 [JP] Japan .................................... 3-060942

[51] Int. Cl.$^6$ .................................................. G06F 15/62
[52] U.S. Cl. ................................................................ 395/155
[58] Field of Search ........................... 395/140, 155, 395/161, 133, 141; 345/157, 162, 163

[56] References Cited

U.S. PATENT DOCUMENTS 4,674,042  6/1987  Hernandez et al. .................... 364/401
4,815,029  3/1989  Barker et al. ........................... 364/900
5,187,776  2/1993  Yanker .................................... 395/157
5,208,909  5/1993  Corona et al. ......................... 395/155

FOREIGN PATENT DOCUMENTS 0194442  9/1986  European Pat. Off. .

OTHER PUBLICATIONS

Microsoft "Windows User Guide—Version 2.0", 1987, pp. 20–34.

*Primary Examiner*—Phu K. Nguyen
*Attorney, Agent, or Firm*—Edward D. Manzo

[57]                 ABSTRACT

A pie chart processor obtains the coordinates of a point indicated by a pointing device, calculates the distance between this point and the center of a pie chart, and compares this distance with the radius of the pie chart to decide whether the point is located in the pie chart. If the point is in the pie chart, the processor tests slices of the pie chart to find a slice containing the point, then executes a program corresponding to that slice.

6 Claims, 11 Drawing Sheets

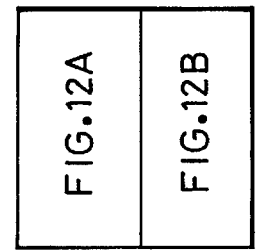
FIG.12
| FIG.12A |
| FIG.12B |
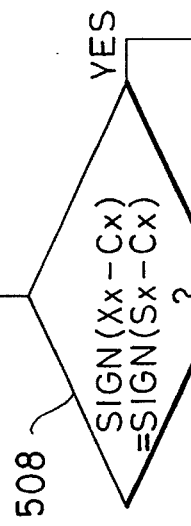
FIG.12A
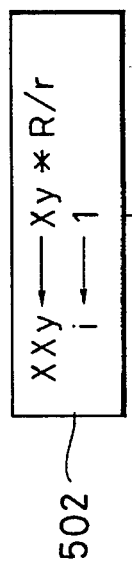
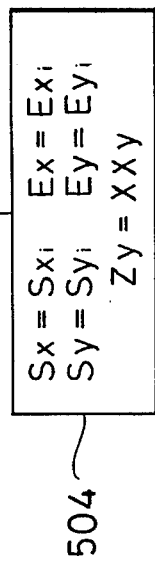

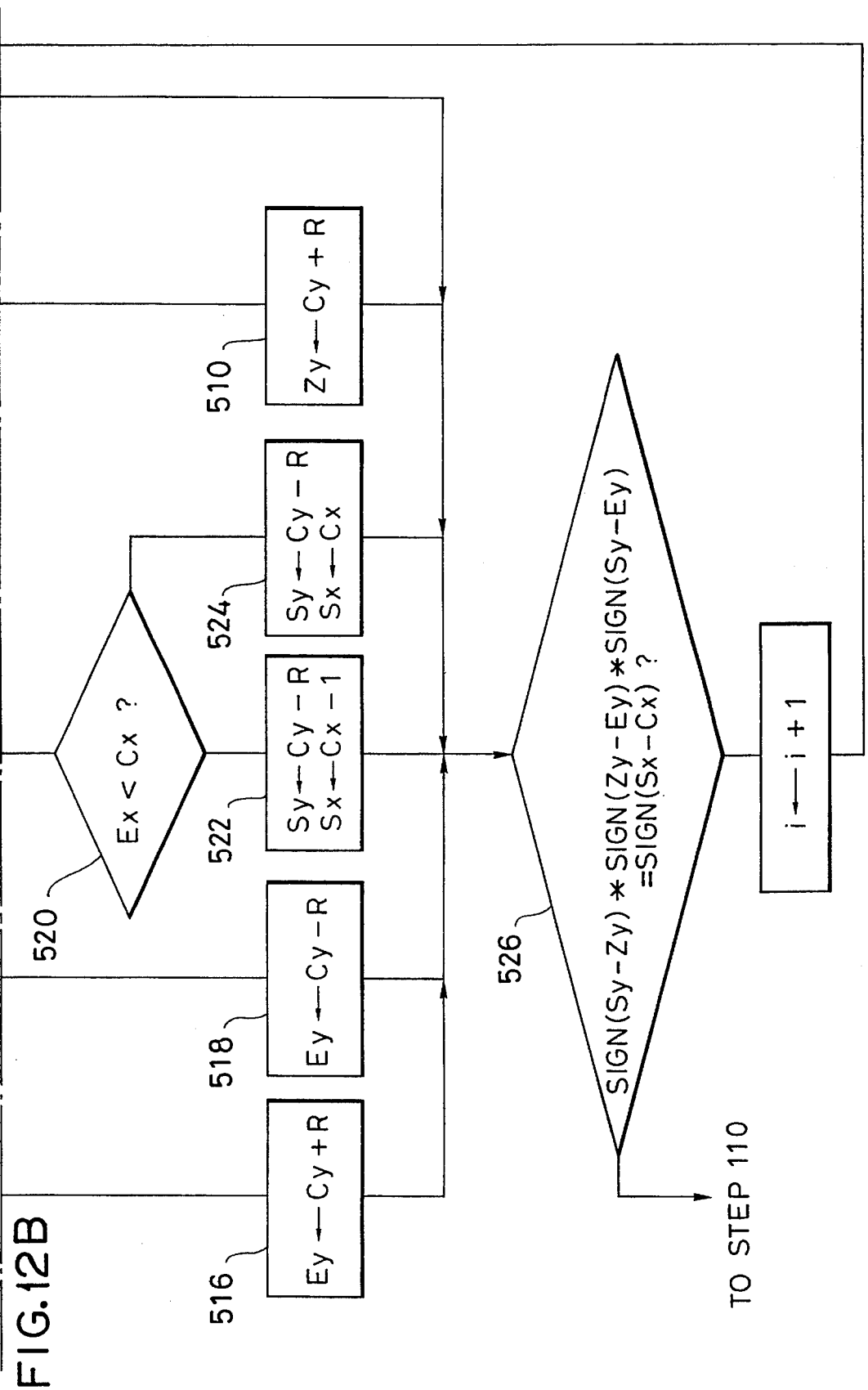

PIE CHART PROCESSING METHOD AND PROCESSOR

BACKGROUND OF THE INVENTION

This invention relates to a method and apparatus for carrying out operations on a pie chart.

Pie charts provide a visual picture of composition data and are widely used in data processing fields. In one common data-processing scenario, a pie chart is shown on a display screen and the operator is asked to select one of the slices of the chart. A computational process is then executed according to the selected slice.

In a prior-art method of selecting slices from a pie chart, the slices are distinguished by different colors or patterns, and depictions of buttons with corresponding colors or patterns are displayed. Using a pointing device such as a so-called mouse, the operator moves a cursor to the button matching the desired slice, then clicks the button (by pressing a physical button on the mouse, for example) to select the slice.

A problem with the prior-art method is that the buttons are displayed in an area separate from the pie chart itself, so the operator must take time to check the correspondence between button and slice, which is source of irritation and mistakes. A further problem is that the buttons take up extra space on the display screen. Display space is generally limited; to accommodate the buttons, the pie chart itself must be reduced in size, making it difficult to distinguish small slices. Moreover, limited space for displaying buttons may restrict the number of allowable slices in the pie chart.

SUMMARY OF THE INVENTION

It is accordingly an object of the present invention to make pie charts easier to use.

Another object of the invention is to save space on display screens.

The invented pie chart processor obtains the coordinates of a point indicated by a pointing device, calculates the distance between this point and the center of a pie chart, and compares this distance with the radius of the pie chart to decide whether the point is located in the pie chart. If the point is in the pie chart, the processor tests slices of the pie chart to find a slice containing the point, then executes a program corresponding to that slice.

BRIEF DESCRIPTION OF THE DRAWINGS

FIG. 12 including 12A and 12B is a flowchart illustrating a fourth method of performing the same step in FIG. 4.

DETAILED DESCRIPTION OF THE INVENTION

The invented pie chart processing method and processor will be described in detail with reference to the drawings. The drawings are intended to illustrate the invention but not to restrict its scope as set forth in the appended claims.

Figure 1:
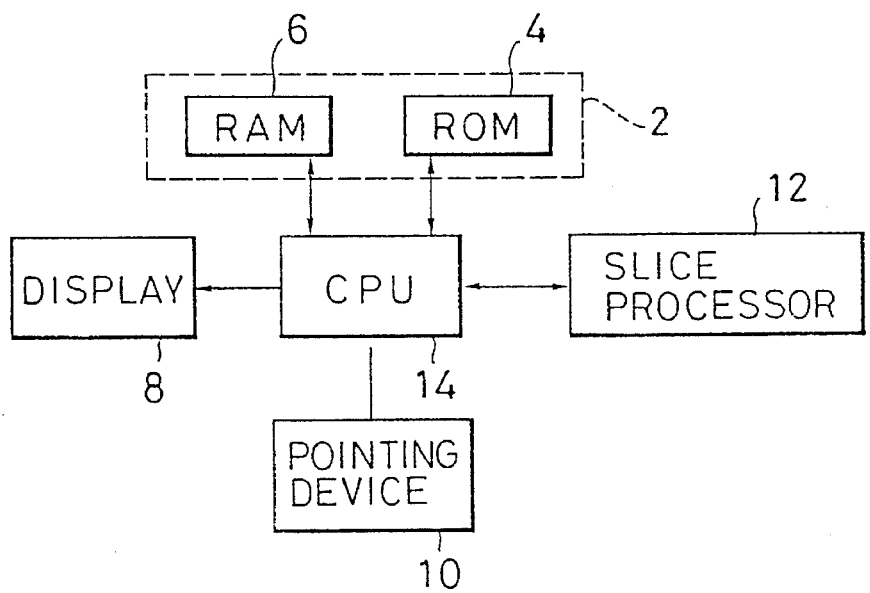
FIG. 1 is a block diagram of the invented pie chart processor.

Referring to FIG. 1, the invented pie chart processor has memory means 2 comprising, for example, read-only memory (ROM) 4 and random-access memory (RAM) 6. The ROM 4 stores basic system programs such as input-output system programs. The RAM 6 is used to store data such as data defining a pie chart and programs such as programs corresponding to slices of the pie chart. These programs may also be stored in the ROM 4.

The pie chart processor also comprises a display 8 for displaying pie charts and possibly other information, and a pointing device 10 for indicating points on the display. The display 8 may be, for example, a cathode-ray tube or liquid-crystal display. The pointing device 10 may be, for example, a mouse or a track ball.

The pie chart processor further comprises a slice processor 12 for determining whether the point indicated by the pointing means 10 is disposed within a pie chart displayed on the display 8, and if so, finding the slice containing the indicated point in the pie chart.

The pie chart processor also comprises a central processing unit (CPU) 14 coupled to the memory means 2, display 8, pointing means 10, and slice processor 12. When the slice processor 12 finds a slice in a pie chart, the CPU 14 executes the program corresponding to that slice. The CPU 14 executes other programs as well, by means of which it controls the display 8 and obtains coordinates of points indicated by the pointing device 10.

Figure 2:
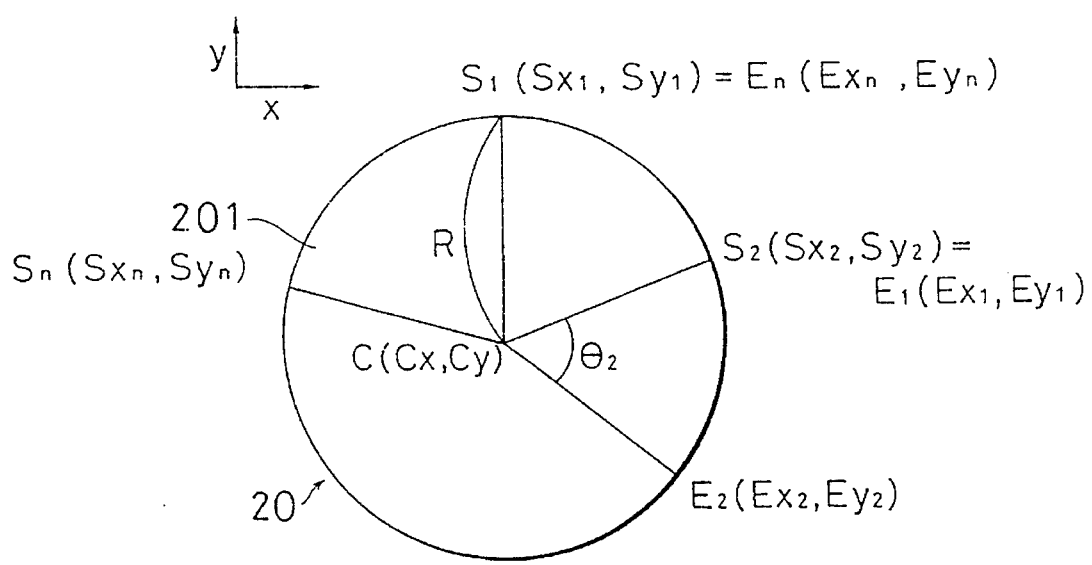
FIG. 2 illustrates a pie chart.

FIG. 2 shows a pie chart of the type displayed on the display 8 in FIG. 1. Locations on the display are designated by x- and y-coordinates, the positive x-direction extending to the right and the positive y-direction extending vertically upward. Other coordinate systems may of course be used if suitable modifications are made in the formulas given later, e.g. the positive y-direction may extend downward, as is often assumed in computer programming languages, or the x-axis may extend vertically and the y-axis horizontally.

The pie chart is centered at a certain point C with coordinates (Cx, Cy) and has a certain radius R. The pie chart is divided into slices by line segments joining the center point C to a set of points $\{S_1, S_2, \ldots, S_n\}$ having coordinates $(Sx_1, Sy_1), (Sx_2, Sy_2), \ldots, (Sx_n, Sy_n)$. The point $S_i$ is said to be the starting point of the i-th slice, and its coordinates are the starting coordinates of that slice. The ending point $E_i$ of the i-th slice is the same as the starting point $S_{i+1}$ of the next slice.

The ending point $E_n$ of the last slice is the same as the starting point of $S_1$ of the first slice. The line segment joining this point to the center point C is called the base line of the pie chart. The base line generally extends vertically up from the center point and the slices are successively numbered clockwise from the base line.

The i-th slice subtends a central angle denoted $\theta_i$. For example, the central angle of the second slice in FIG. 2 is $\theta_2$.

The starting and ending angles of the i-th slice are the angles from the center point C to the starting and ending points $S_i$ and $E_i$ measured with respect to the base line. For example, the starting angle of the first slice is zero.

Figure 3:
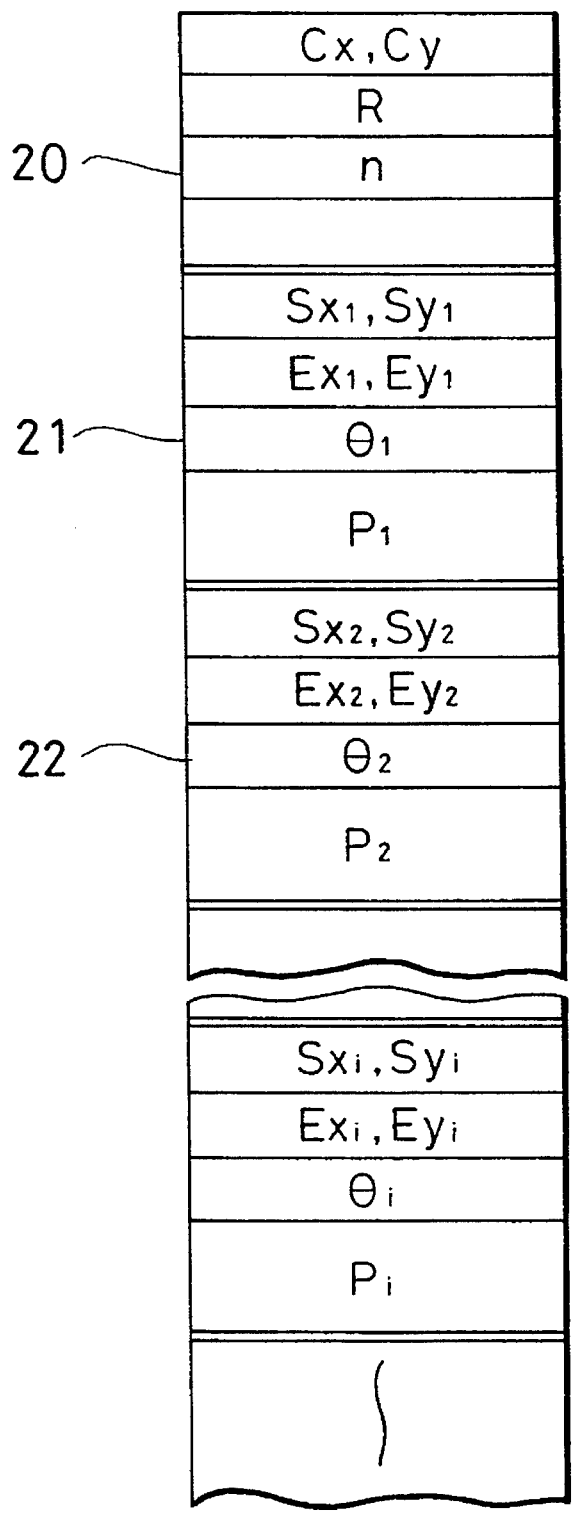
FIG. 3 illustrates the storage of data defining a pie chart.

FIG. 3 illustrates data stored in the RAM 6 in FIG. 1 defining the pie chart in FIG. 2. The data storage area is divided into blocks. The zeroth block 20 contains basic data such as the coordinates (Cx, Cy) of the center of the pie chart, the radius R, and the number of slices n. The zeroth block 20 may contain further information as well, such as the title of the pie chart and pointers to the other data blocks.

The first block 21 contains information pertaining to the first slice, such as the coordinates $(Sx_1, Sy_1)$ and $(Ex_1, Ey_1)$ of its starting and ending points and its central angle $\theta_1$. In FIG. 3 the first block 21 also contains a program $P_1$ to be executed when the first slice is selected. The second block 22 contains similar information about the second slice, and information about other slices is likewise stored in other blocks.

The operation of the invented pie chart processor and the invented pie chart processing method will be explained with reference to FIG. 4 to FIG. 13.

Figure 4:
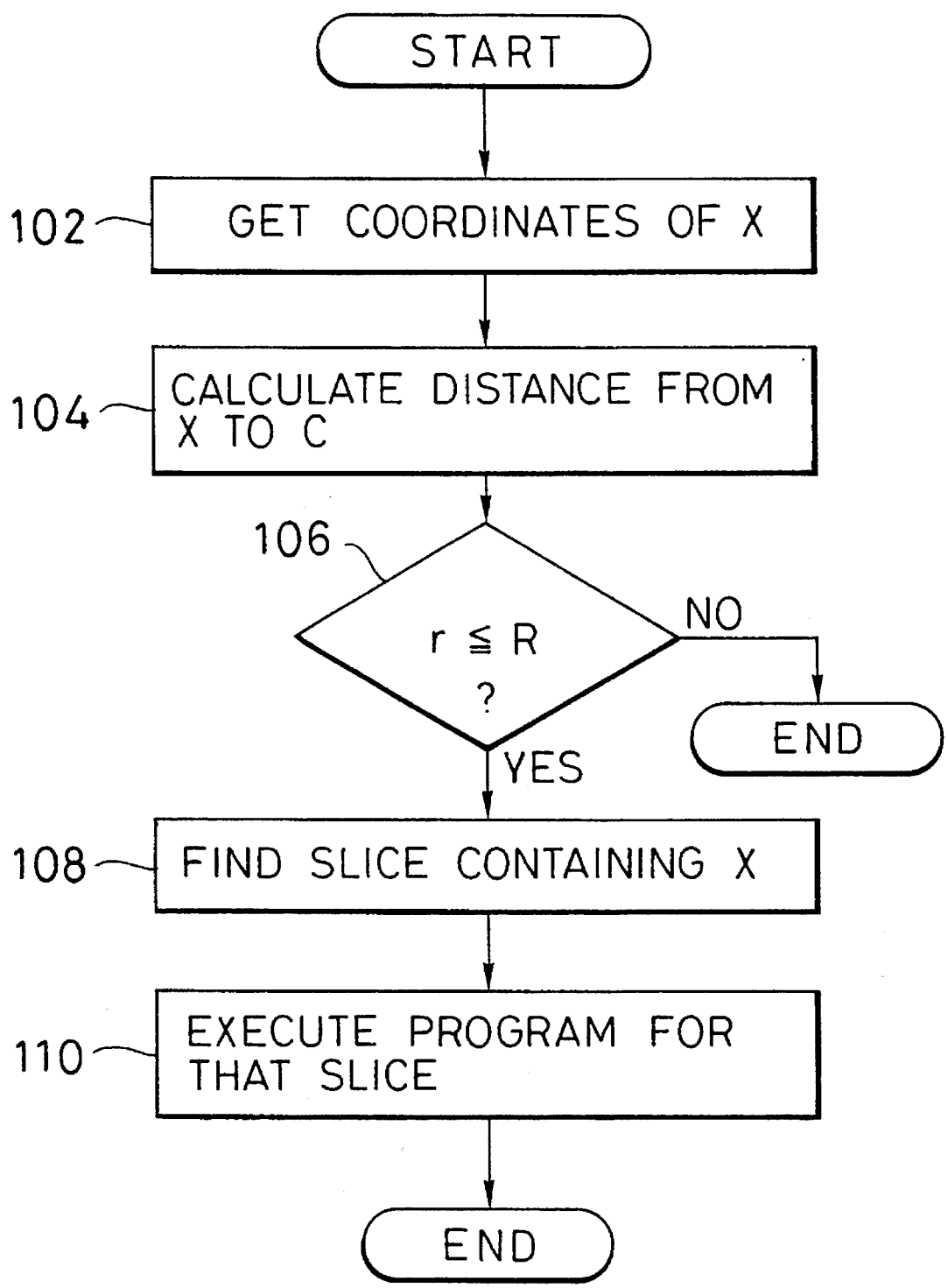
FIG. 4 is a flowchart illustrating a novel pie chart processing method.

Referring to FIG. 4, in the first step 102 the operator uses the pointing device 10 to indicate a point X on the display 8. The CPU 14 calculates the coordinates (Xx, Xy) of this point and furnishes them to the slice processor 12.

In the next step 104 the slice processor 12 calculates the distance r from the point X to the center point C.

In the next step 106 the slice processor 12 compares the calculated distance r with the radius R of the pie chart. If r>R then the point X is not in the pie chart and the slice processor 12 terminates. If r≦R then the point X is in the pie chart and the slice processor 12 proceeds to the next step.

In this next step 108 the slice processor 12 tests successive slices in the pie chart to find the slice containing the point X. Ways of carrying out this step will be described in more detail later.

In the last step 110, the slice processor 12 informs the CPU 14 which slice contains X, and the CPU 14 executes the program corresponding to that slice.

A merit of this process is that the operator can point in a direct and natural way to the slice he wishes to select, instead of a button representing that slice. Moreover, the space devoted to buttons in the prior art can be put to more meaningful use, such as increasing the radius of the pie chart.

A first method of carrying out the step 108 of testing successive slices will next be described with reference to FIG. 5. This method calculates the angle $\theta$ formed by the point X, the center point point C, and the base line; that is, the angle from $S_1$ to C to X. This angle $\theta$ is then compared with the ending angles of successive slices to find the slice containing X.

Figure 5:
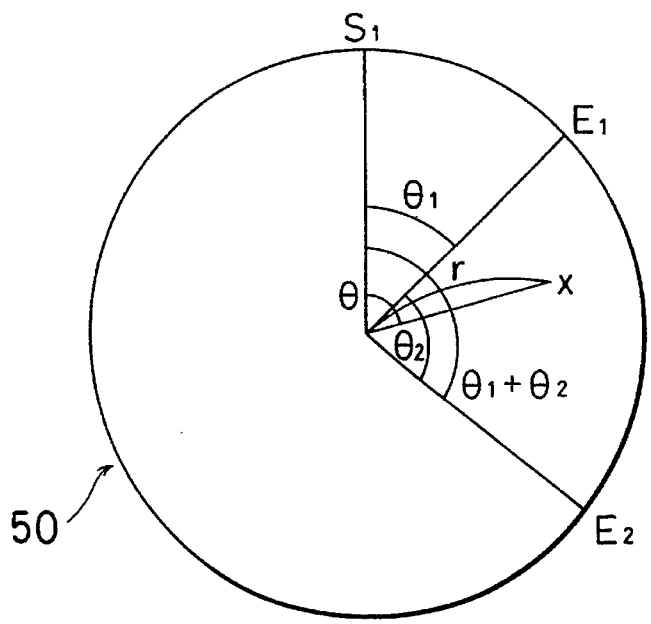
FIG. 5 is a pie-chart diagram illustrating a first method of performing a step in FIG. 4.

In FIG. 5, for example, the slice processor 12 first compares $\theta$ with $\theta_1$, the central angle of the first slice, which is also the ending angle of this slice. Since $\theta \geq \theta_1$, X is not disposed in the first slice. Next the slice processor 12 adds $\theta_2$, the central angle of the second slice, to $\theta_1$ to obtain the ending angle of the second slice, and compares $\theta$ with the sum $\theta_1+\theta_2$. Since $\theta<\theta_1+\theta_2$, X is disposed in the second slice.

Figure 6:
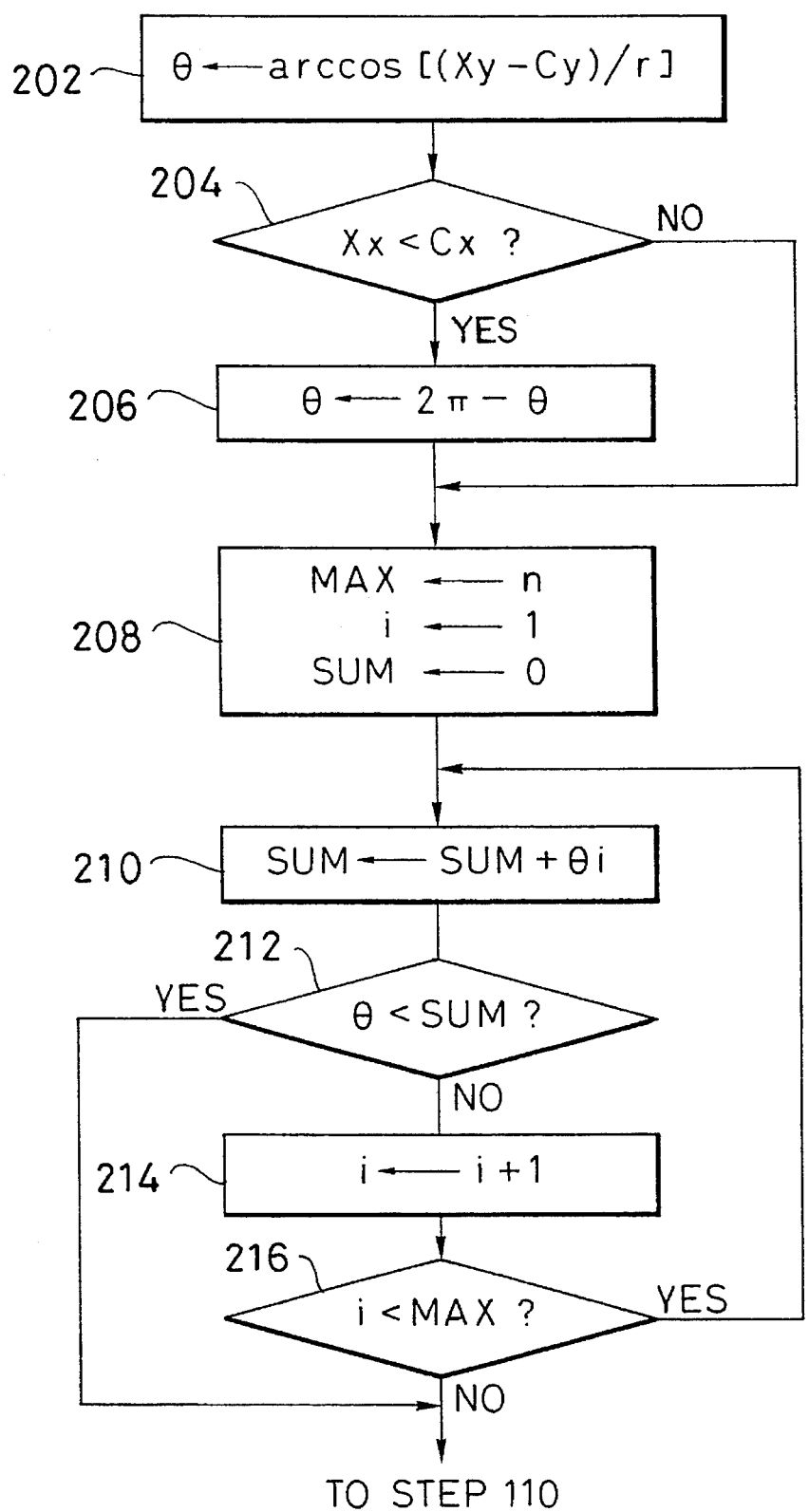
FIG. 6 is a flowchart illustrating the first method.

FIG. 6 is a flowchart illustrating this process. To calculate the angle $\theta$, in the first step 202 the slice processor 12 divides the difference between the y-coordinates of X and C by the distance r and calculates the inverse cosine of the quotient. The inverse cosine. (arccosine) is a radian value in the range from 0 to $\pi$. The result so far is ambiguous, because X could be located in either the right half or the left half of the pie chart.

In the next step 204 the slice processor 12 compares the x-coordinates of X and C.

In the next step 206, If Xx<Cx, indicating that X is disposed in the left half of the pie chart, the slice processor 12 replaces $\theta$ with $2\pi-\theta$. The value of $\theta$ now correctly represents the position of X.

In the next step 208 the slice processor 12 initializes a variable MAX to the number of slices n, a variable i to the value one, and a variable SUM to the value zero.

In the next step 210, the slice processor 12 adds the central angle $\theta_i$ of the i-th slice to SUM, making SUM equal to the ending angle of the i-th slice.

In the next step 212, the slice processor 12 compares $\theta$ with SUM. If $\theta<$SUM, the slice processor 12 notifies the CPU 14 that X is disposed in the i-th slice, and the CPU 14 proceeds to execute the program $P_i$ corresponding to that slice. If $\theta \geq$SUM, the slice processor 12 proceeds to the next step.

In the next step 214, the slice processor 12 increments the variable i.

In the next step 214, the slice processor 12 compares i with MAX. If i<MAX, then the slice processor 12 returns to step 210 and proceeds to test the next slice. If i=MAX=n, however, then by process of elimination X must be located in the last slice, so the slice processor 12 notifies the CPU 14, which proceeds to execute the program $P_n$ for that slice.

This first method does not use the starting and ending coordinates of the slices, so the $Sx_i$, $Sy_i$, $Ex_i$, and $Ey_i$ data in FIG. 3 are not necessary; it suffices to store the central angles $\theta_i$ and programs $P_i$. The central angle values $\theta_i$ can generally be derived in a natural way from the data embodied in the pie chart, by normalizing the composition values so that they total $2\pi$, for example.

The method illustrated in FIG. 6 can be paraphrased as finding the point X to be within the i-th slice if the angle $\theta$ formed by the point X is between the ending angle of the i-th slice and the starting angle of the i-th slice, since the starting angle of the i-th slice is identical to the ending angle of the (i−1)-th slice. The test as to whether the angle $\theta$ is smaller than the ending angle of each of the slices need not be successive, i.e., for the first slice, the second slice, the third slice, and so on, but may be carried out in a different order.

In the method illustrated in FIG. 6, the angle formed by the point X is compared with the ending angles of the successive slices. In order to find whether the point X is within each slice it is essential to compare the angle of the point X with the starting and end angles. In the method of FIG. 6, comparison with the ending angle of the preceding slice can be regarded as constituting comparison with the starting angle of the slice in question.

Next a second method of carrying out the step 108 in FIG. 4 of testing successive slices will be described. This method has the advantage of not using the inverse cosine function, calculation of which is somewhat time-consuming.

Figure 7:
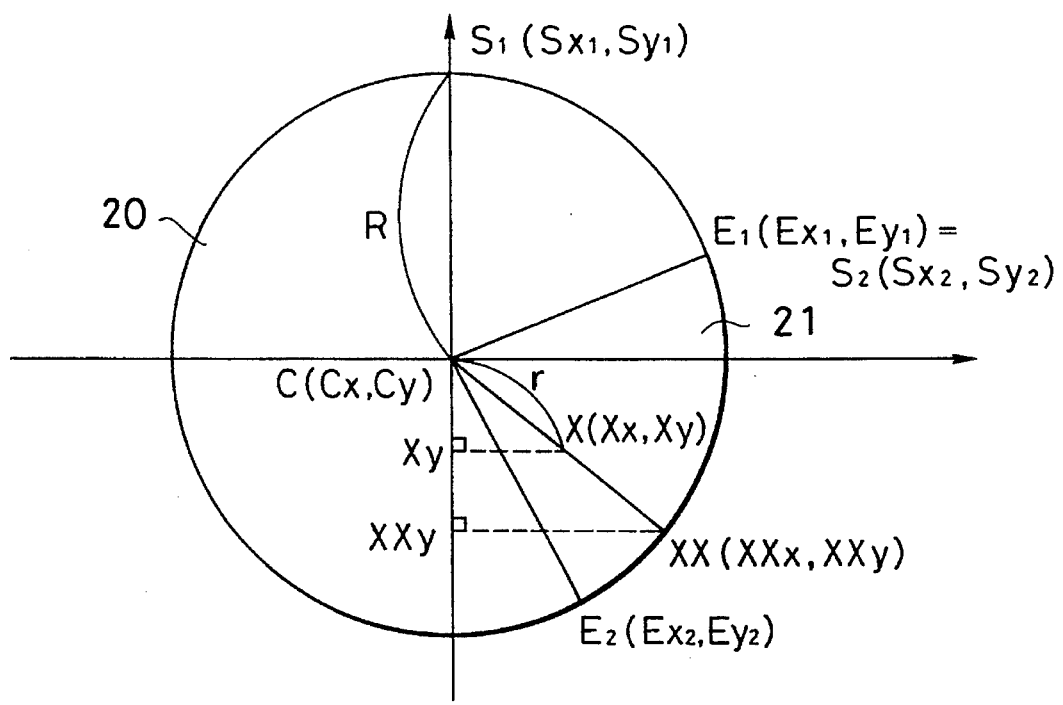
FIG. 7 is a pie-chart diagram illustrating a second method of performing the same step in FIG. 4.

Referring to FIG. 7, the second method starts by extending the line from C to X to a new point XX on the perimeter of the pie chart, and finding the y-coordinate XXy of this new point. In other words, the second method first finds a point XX with y-coordinate XXy at an intersection of a line passing C and X and the perimeter of the pie chart. XXy is then compared with the ending coordinates of successive slices to find the first slice that ends beyond XX. If X and XX are in the right half of the pie chart, this slice is the first slice that ends below XX in the right half, or ends in the left half. If X and XX are in the left half of the pie chart, this slice is the first slice that ends above XX 111 the left half.

Figure 8:
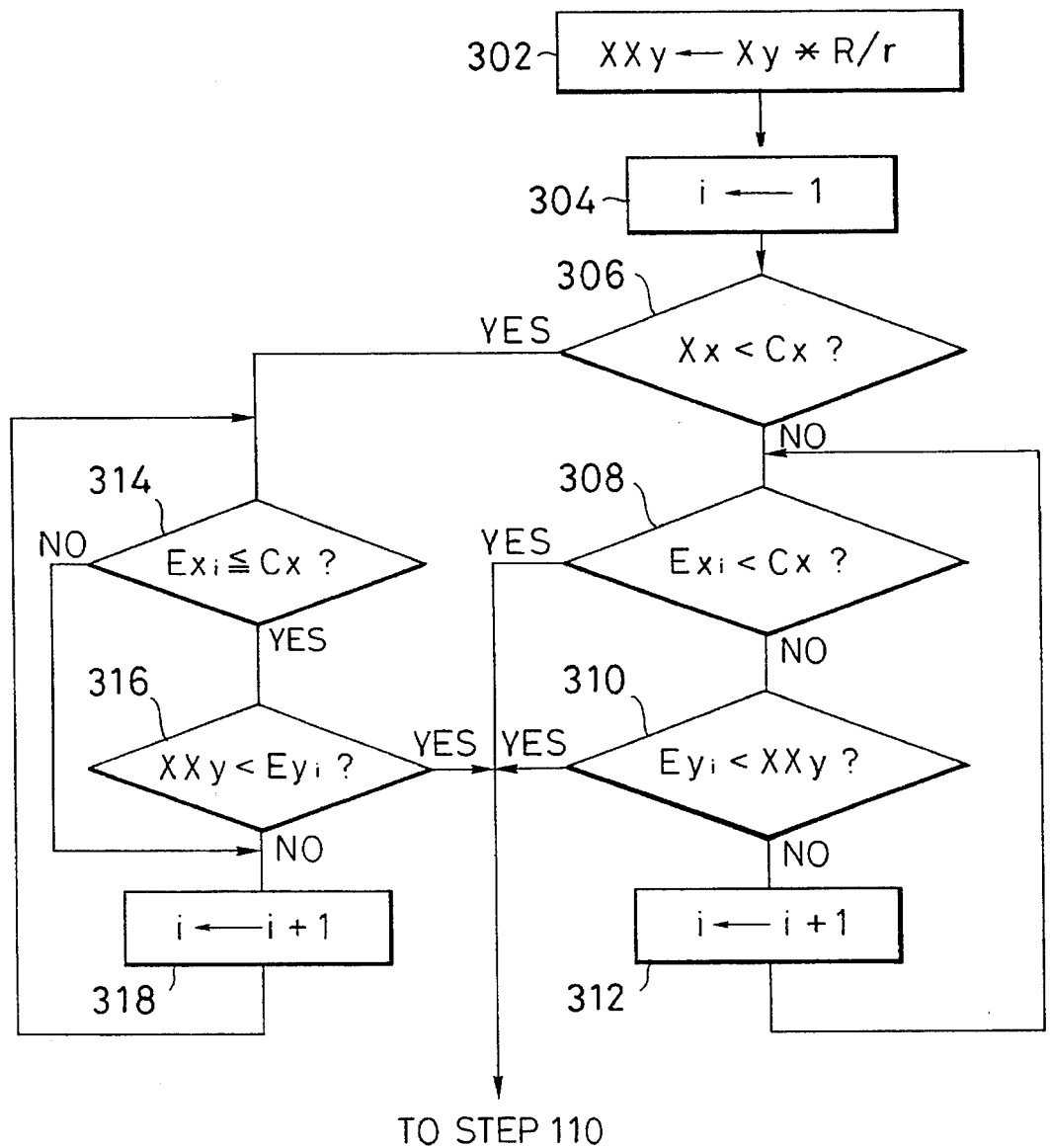
FIG. 8 is a flowchart illustrating the second method.

Referring to FIG. 8, in the first step 302 the slice processor 12 multiplies the y-coordinate of the point X by the radius R of the pie chart divided by the distance r to obtain the y-coordinate XXy of the point XX on the perimeter of the pie chart.

In the next step 304, the slice processor 12 initializes a variable i to the value one.

In the next step 306, the slice processor 12 compares the x-coordinates of X and C to decide whether X (hence XX) is disposed in the left or right half of the pie chart.

If X is disposed in the right half ($Xx \geq Cx$), then in the next step 308 the slice processor 12 compares the x-coordinates of $E_i$ and C. If $Ex_i < Cx$, indicating that the i-th slice ends in the left half, the slice processor 12 notifies the CPU 14 that the X is disposed in the i-th slice and the CPU 14 executes the program $P_i$.

If the i-th slice ends in the right half, in the next step 310 the slice processor 12 compares the y-coordinates of XX and $E_i$ to decide whether the i-th slice ends below XX. If it does ($Ey_i < XXy$), the slice processor 12 notifies the CPU 14 that the X is disposed in the i-th slice and the CPU 14 executes the program $P_i$.

If the i-th slice does not end below XX, in the next step 312 the slice processor 12 increments i and returns to step 308 to test the next slice.

If in step 306 it is found that X and XX are disposed in the left half of the pie chart ($Xx < Cx$), in step 314 the slice processor 12 again compares the x-coordinates of $E_i$ and C.

IF $Ex_i < Cx$, indicating that the i-th slice ends in the eft half, in the next step 316 the slice processor 12 compares the y-coordinates of $E_i$ and XX to decide whether the i-th slice ends above XX. If it does ($XXy < Ey_i$), the slice processor 12 notifies the CPU 14 that the X is disposed in the i-th slice and the CPU 14 executes the program $P_i$.

If the i-th slice is found to end in the right half in step 314, or not to end above XX in step 316, in the next step 318 the slice processor 12 increments i and returns to step 314 to test the next slice.

When the method illustrated in FIG. 8 is employed, it is not necessary to store the central angles $\theta_i$ of the slices or their starting coordinates $Sx_i$ and $Sy_i$ in the RAM 6 in FIG. 3. It suffices to store the ending coordinates $Ex_i$ and $Ey_i$ and programs $P_i$.

In the method illustrated in FIG. 8, the coordinate of the point X is compared with the coordinate of the ending points of the successive slices. In order to find whether the point X is within each slice it is essential to compare the coordinate of the point X with the coordinates of the starting and ending points. In the method of FIG. 8, comparison with the ending point of the preceding slice can be regarded as constituting comparison with the starting point of the slice in question.

Next a third method of carrying out the step 108 in FIG. 4 of testing successive slices will be described. This method also has the advantage of not using the inverse cosine function.

Like the second method, the third method extends the line from C to X to a point XX on the perimeter of the pie chart and finds the y-coordinate XXy of XX.

To decide whether X is disposed in the i-th slice, the third method begins by deciding whether XX, $S_i$, and $E_i$ are all disposed in the same half (left or right) of the pie chart. If XX and $S_i$ are in one half and $E_i$ is in the other half, $E_i$ is moved to the ending point of the half containing XX and $S_i$, so that it is disposed in the same half as the other two. If XX and $E_i$ are in one half and $S_i$ is in the other half, $S_i$ is moved to the starting point of the half containing XX and $E_i$, so that it is disposed in the same half as the other two.

A decision as to whether X is disposed in the i-th slice is then made by comparing the y-coordinates of XX, $S_i$, and $E_i$. If the y-coordinate of XX is between the y-coordinates of $S_i$ and $E_i$, X is found to be within the i-th slice.

Figure 9:
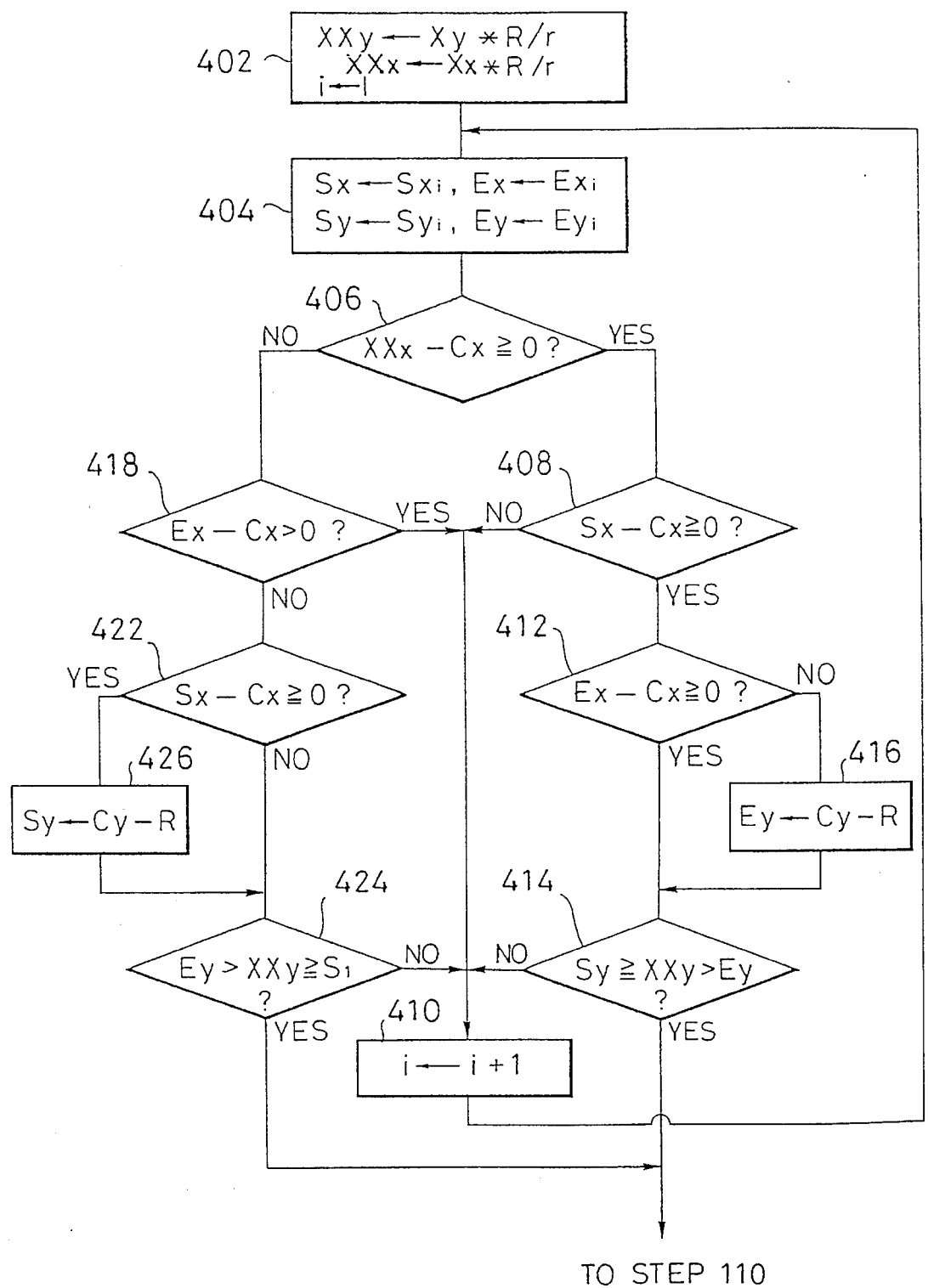
FIG. 9 is a flowchart illustrating a third method of performing the same step in FIG. 4.

Referring to FIG. 9, in the first step 402 the slice processor 12 initializes a variable i to the value one and calculates XXy in the same way as in the second method.

In the next step 404 the slice processor 12 assigns the starting and ending coordinates of the i-th slice to variables Sx, Sy, Ex, and Ey. These assignments are made so that the starting and ending points S and E can be moved without permanently altering the pie chart data. The succeeding description will refer to a point S initially located at $S_i$, with coordinates (Sx, Sy); a point E initially located at $E_i$, with coordinates (Ex, Ey); and a point XX, with x-coordinate XXx and y-coordinate XXy.

In the next step 406 the slice processor 12 finds whether the point XX is in the right half or the left half of the pie chart, by comparing (XXx–Cx) with 0. If the point XX is found to be in the right half, then at the next step 408, the slice processor 12 finds whether the point S is in the right half or the left half of the pie chart by comparing (Sx–Cx) with 0. If the point S is found to be in the left half, the point XX is found to be outside the i-th slice, and the variable i is incremented by one (step 410) to perform a similar test for the next slice.

Figure 10:
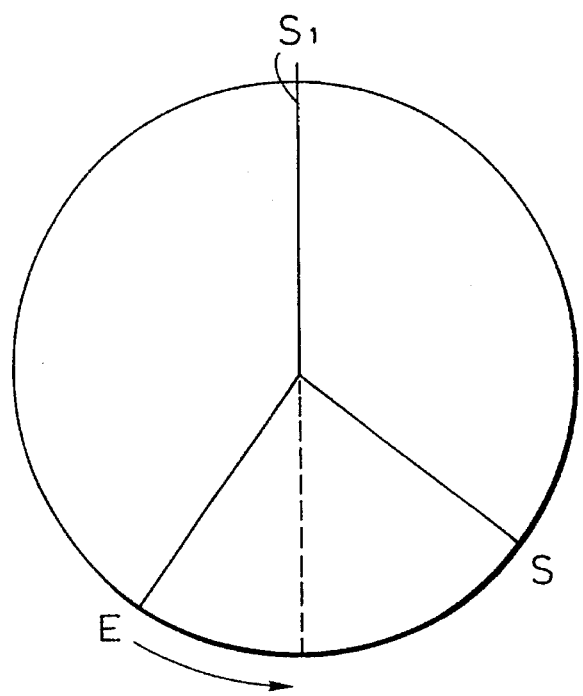
FIG. 10 and FIG. 11 are pie-chart diagrams illustrating the third method.

If the starting point S is found to be in the right half, then at the next step 412, the slice processor 12 finds whether the ending point E is in the right half of the pie chart, by comparing (Ex–Cx) with 0. If the ending point E is found to be in the right half, the slice processor 12 finds whether XXy is not greater than Sy and is greater than Ey (step 414). If at the step 412 the ending point E is found to be in the left half, (Cy–R) is assigned to Ey (step 416), and then the test at step 416 is performed. The step 416 signifies moving the ending point E that is subsequently used for the test at the step 414 to the ending point of the right half, as shown in FIG. 10. In other words, a point at the end of the right half of the pie chart is used in substitution for the ending point $E_i$ which was earlier assigned as E. If the result of the test at the step 414 is affirmative, the point X is found to be within the slice. If it is negative, the point X is found to be outside the slice, and the variable i is incremented by 1 (step 410) to perform a similar test for the next slice.

If, at the step 406, the point XX is found to be in the left half, then at the next step 418, the slice processor 12 finds whether the ending point E is in the right half or the left half of the pie chart by comparing (Ex–Cx) with 0. If the ending point E is found to be in the right half, the point XX is found to be outside the i-th slice, and the variable i is incremented (step 410) to test the next slice.

Figure 11:
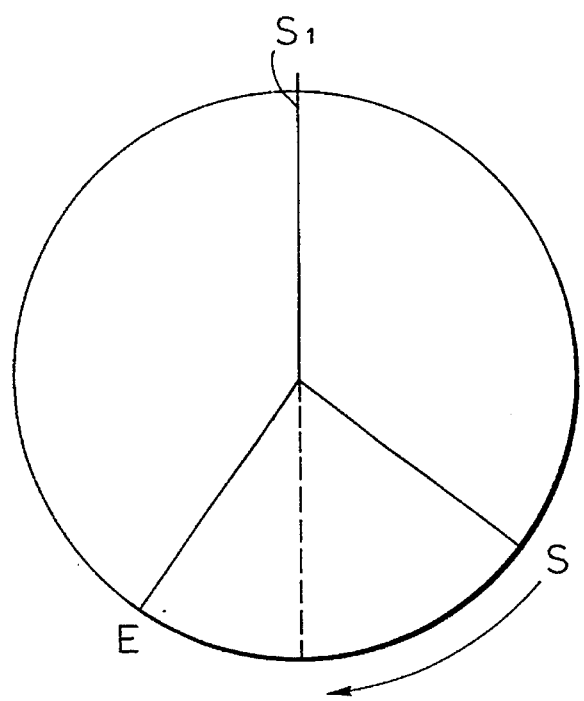

If the ending point E is found to be in the left half, then at the next step 422, the slice processor 12 finds whether the starting point S is in the right half of the pie chart, by comparing (Sx–Cx) with 0. If the starting point S is found to be in the left half, the slice processor 12 finds whether the coordinate XXy is not greater than Ey and is greater than Sy (step 424). If at the step 422 the starting point S is found to be in the right half, (Cy–R) is assigned to Sy (step 426), and then the test at step 424 is performed. The step 426 signifies moving the point S which is subsequently used for the test at the step 414 to the starting point of the left half, as shown in FIG. 11. In other words, a point at the start of the left half of the pie chart is used in substitution for time starting point $S_i$ which was earlier assigned as S. If the result of the test at the step 424 is affirmative, the point X is found to be within the slice. If it is negative, the point X is found to be outside the slice, and the variable i is incremented (step 410) to test the next slice.

Aside from the initial multiplication in step 402, the third method uses only subtraction and comparing operations which can be carried out quite rapidly. Hardware requirements for these operations are minimal: a standard adder for performing subtraction operations, and a one-bit exclusive-OR gate or one-bit half adder for testing the sign of the result of the subtraction.

When the third method is used, time central angles in FIG. 3 are not required. It suffices to store the starting and ending coordinates of the slices.

The methods described so far assume that the first slice starts from a base line extending vertically upward. Next a fourth method will be described that does not rely on this assumption but allows the first slice to start at any position.

Like the second and third methods, the fourth method extends the line from C to X to a new point XX on the perimeter of the pie chart, and finding the y-coordinate XXy of XX.

To decide whether X is disposed In the i-th slice, the fourth method begins by deciding whether XX, $S_i$, and $E_i$ are all disposed in the same half (left or right) of the pie chart. If they are not, it moves one of these three points so that it is disposed in the same half as the other two. If XX and $S_i$ are in one half and $E_i$ is in the other half, $E_i$ is moved to the ending point of the half containing XX and $S_i$. If XX and $E_i$ are in one half and $S_i$ is in the other half, $S_i$ is moved to the starting point of the half containing XX and $E_i$. If $S_i$ and $E_i$ are in one half and XX is in the other half, then XX is moved to an extremal point (either the starting or ending point) of the half containing $S_i$ and $E_i$.

A decision as to whether X is disposed in the i-th slice is then made by comparing the y-coordinates of XX, $S_i$, and $E_i$. The comparison is made in a simple way by determining the positive or negative signs of the y-coordinates of three vectors Joining $S_i$ and XX, XX and $E_i$, and $S_i$ and $E_i$, then multiplying these three signs together and testing equality of the product with the sign of the half of the pie chart containing S, E, and Z; that is, with the sign of the x-coordinate of a vector joining C and $S_i$, $E_i$, or XX.

Referring to FIG. 12, in the first step 502 the slice processor 12 initializes a variable i to the value one and calculates XXy in the same way as In the second method.

In the next step 504 the slice processor 12 assigns the starting and ending coordinates of the i-th slice to variables Sx, Sy, Ex, and Ey, and assigns XXy to a variable Zy. These assignments are made so that points can be moved without permanently altering the pie chart data or the location of XX. The succeeding description will refer to a point S initially located at $S_i$, with coordinates (Sx, Sy); a point E initially located at $E_i$, with coordinates (Ex, Ey); and a point Z initially located at XX, with y-coordinate Zy.

In the next step 506 the slice processor 12 compares the signs of Sx–Cx and Ex–Cx to decide whether S and E are in the same half of the pie chart.

If they are, then in the next step 508 the slice processor 12 compares the signs of Xx–Cx and Sx–Cx to decide whether Z and S are in the same half of the pie chart. If they are not, in the next step 510 the slice processor 12 moves Z to the top of the pie chart by assigning the value Cy+R to the y-coordinate Zy of Z.

If S and E are found to be in different halves in step 506, then the slice processor 12 proceeds to step 512 in which it performs the same operation as in step 508, comparing the signs of Xx–Cx and Sx–Cx to decide whether Z and S are in the same half of the pie chart.

If Z and S are in the same half, the slice processor 12 proceeds in step 514 to decide whether this half is the left or right half. Depending on the result of this decision, in step 516 or 518 the slice processor 12 moves E to the top or bottom of the pie chart so that E is located at the end of the half containing S and Z.

If Z and S are not in the same half, it can be inferred that E and Z are in the same half. The slice processor 12 then proceeds in step 520 to decide whether this half is the left or right half and, in step 522 or 524, to move S to the top or bottom of the pie chart so that S is located at the start of the half containing E and Z.

In steps 522 and 524 the x-coordinate of S is adjusted so that the vector from C to S will correctly indicate the right or left half of the pie chart. Zero is considered positive, so in step 522 Sx is adjusted to Cx–1 to make Sx– Cx negative. In steps 510, 516, and 522 modifications of the x-coordinates are not needed for subsequent operations, so they are omitted.

After the above steps have been completed, the points S, E, and Z are all located in the same half of the pie chart. In step 526 the slice processor 12 now multiplies the signs of Sy–Zy, Zy–Ey, and Sy–Ey together and compares the product with the sign of Sx–Cx. If the two are equal, the slice processor 12 notifies the CPU 14 that the point X is disposed in the i-th slice, and the CPU 14 executes the program $P_i$.

If the two are not equal, in the next step 528 the slice processor 12 increments the variable i and returns to step 504 to test the next slice.

Figure 13:
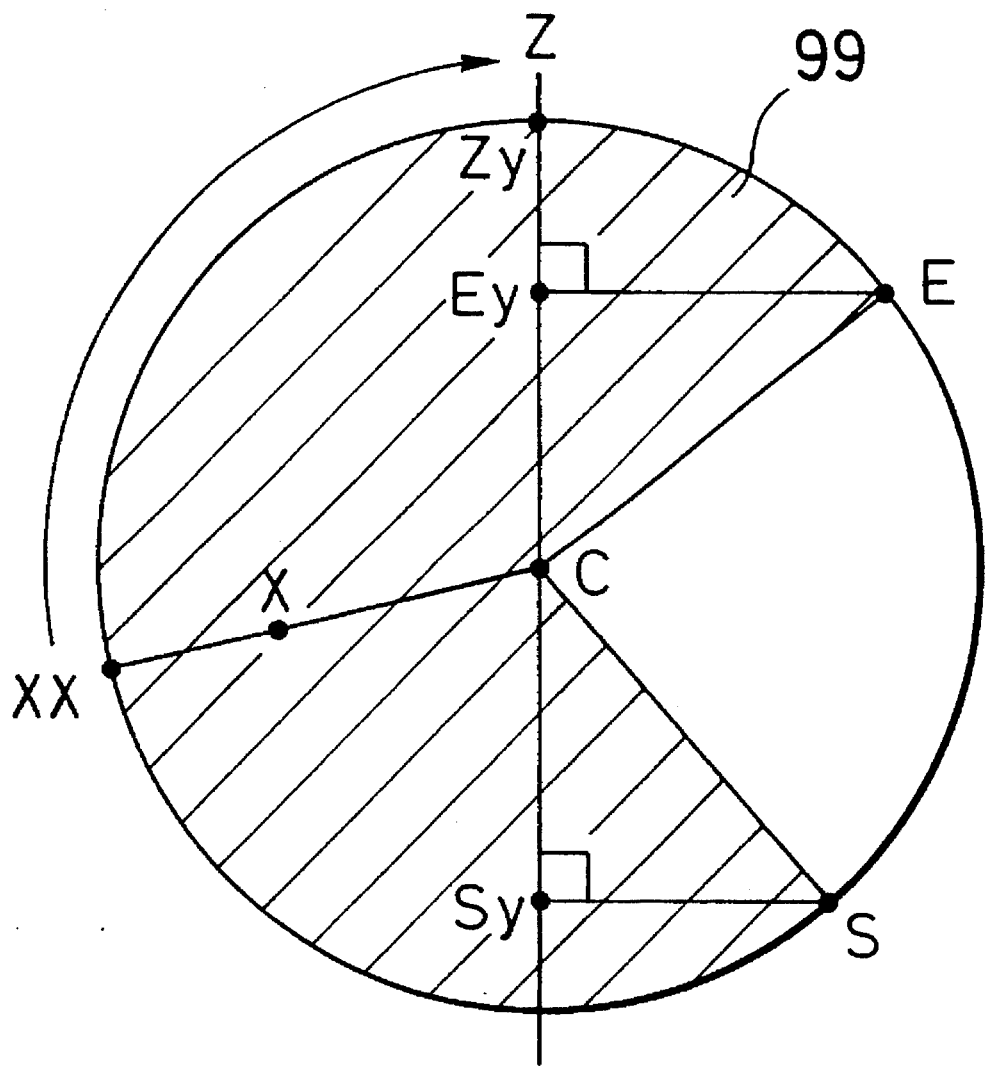
FIG. 13 is a pie-chart diagram illustrating the fourth method.

FIG. 13 shows an example of a pie chart that has a large slice 99 (hatched in the drawing) comprising all of the left half of the pie chart and parts of the right half as well. The point X is disposed in the left half of the pie chart. The slice processor 12 moves Z from its original location at XX to the top of the pie chart, then computes:

$$\text{SIGN}(Sy-Zy) \times \text{SIGN}(Zy-Ey) \times \text{SIGN}(Sy-Ey) = \text{negative} \times \text{positive} \times \text{negative} = \text{positive}$$

Since the sign of (Sx–Cx) is also positive, the slice processor 12 decides correctly that X is disposed in the hatched slice 99.

If one of the three points E, S, and Z is moved across another one of these three points, just one of the three sign values in the preceding equation changes. A simple argument based on this observation shows that the fourth method works correctly in all cases.

Signed data are generally stored in computing devices in binary notation, the first binary bit being a sign bit representing the sign of the value. Zero represents a positive sign; one represents a negative sign. Sign multiplication can be carried out by adding sign bits modulo two, the rule that negative×negative=positive corresponding to the rule that one+one=zero modulo two.

Aside from the initial multiplication in step 502, the fourth method uses only subtraction and sign operations which can be carried out quite rapidly. Hardware requirements for these operations are minimal: a standard adder for performing subtraction operations, and a one-bit exclusive-OR gate or one-bit half adder for testing equality of sign bits and performing sign multiplication in step 526.

When the fourth method is used, the central angles in FIG. 3 are not required. It suffices to store the starting and ending coordinates of the slices.

In the methods described with reference to the drawings, the test as to whether the point X is within each slice is made successively, i.e., in the order of the first slice, the second slice, the third slice, and so on, with the point XX. But, this test may be made in a different order.

Instead of using special-purpose hardware, the slice processor 12 can be implemented in software running on the CPU 14 in FIG. 1. Various modifications of an evident nature can also be made to the flowcharts in FIGS. 6, 8, 9, and 12 without departing from the spirit and scope of the present invention, which should be determined solely from the appended claims.

What is claimed is:

1. A pie chart processing method enabling an operator to select a slice from a pie chart composed of a plurality of slices directly with a pointing device, comprising the steps of:

(a) obtaining coordinates of a point indicated by the pointing device;

(b) calculating a distance between said point and a center point of said pie chart;

(c) comparing said distance with a radius of said pie chart, thus deciding whether said point is disposed in said pie chart;

(d30) if said point is disposed in said pie chart, then assigning starting and ending points of one of said slices as points S and E, respectively, and extending a line from said center point of said pie chart through said point indicated by the pointing device to a point Z on a perimeter of said pie chart;

(d31) if S and Z are disposed in a first half of said pie chart and E is disposed in a different half, moving E to an ending point of said first half;

(d32) if E and Z are disposed in a first half of said pie chart and S is disposed in a different half, moving S to a starting point of said first half;

(d33) comparing coordinates of Z, S and E to determine whether said point is disposed in said one of said slices; and (e) if said point is disposed in said one of said slices, then executing a program corresponding to said one of said slices.

2. The method of claim 1, wherein if said point is disposed in said pie chart, said steps (d30) to (d33) are repeated for different slices among said plurality of slices, until a slice in which said point is disposed is found.

3. The method of claim 1, further comprising the step, performed before step (a), of storing a plurality of programs corresponding to said plurality of slices in a memory device for execution in step (e) when said point is found to be disposed in a respective slice.

4. A pie chart processing method enabling an operator to select a slice from a pie chart composed of a plurality of slices directly with a pointing device, comprising the steps of:

(a) obtaining coordinates of a point indicated by the pointing device;

(b) calculating a distance between said point and a center point of said pie chart;

(c) comparing said distance with a radius of said pie chart, thus deciding whether said point is disposed in said pie chart;

(d40) if said point is disposed in said pie chart, then assigning starting and ending points of one of said slices as points S and E, respectively, and extending a line from said center point of said pie chart through said point indicated by the pointing device to a point Z on a perimeter of said pie chart;

(d41) if S and E are disposed in a first half of said pie chart and Z is disposed in a different half, moving Z to an extremal point of said first half;

(d42) if S and Z are disposed in a first half of said pie chart and E is disposed in a different half, moving E to an ending point of said first half;

(d43) if E and Z are disposed in a first half of said pie chart and S is disposed in a different half, moving S to a starting point of said first half;

(d44) comparing a sign designating a half of said pie chart containing S, E and Z with a product of signs of coordinates of a vector joining S and Z, a vector joining Z and E, and a vector joining S and E to determine whether said point is disposed in said one of said slices; and (e) if said point is disposed in said one of said slices, then executing a program corresponding to said one of said slices.

5. The method claim 4, wherein if said point is disposed in said pie chart, said steps (d40) to (d44) are repeated for different slices among said plurality of slices, until a slice in which said point is disposed is found.

6. The method of claim 4, further comprising the step, performed before step (a), of storing a plurality of programs corresponding to said plurality of slices in a memory device for execution in step (e) when said point is found to be disposed in a respective slice.

* * * * *